(12) United States Patent
Lavoie

(10) Patent No.: US 10,196,088 B2
(45) Date of Patent: Feb. 5, 2019

(54) TARGET MONITORING SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/571,963

(22) Filed: Dec. 16, 2014

(65) Prior Publication Data

US 2015/0138340 A1    May 21, 2015

Related U.S. Application Data

(63) Continuation-in-part of application No. 14/257,420, filed on Apr. 21, 2014, now Pat. No. 9,708,000.
(Continued)

(51) Int. Cl.
*B62D 13/06* (2006.01)
*H04N 7/18* (2006.01)
(Continued)

(52) U.S. Cl.
CPC .............. *B62D 13/06* (2013.01); *B60D 1/36* (2013.01); *B60Q 9/005* (2013.01);
(Continued)

(58) Field of Classification Search
CPC ......... G06T 7/0042; G06T 2207/10016; G06T 2207/30201; G06T 2207/30232;
(Continued)

(56) References Cited

U.S. PATENT DOCUMENTS 3,542,390 A    11/1970  Fikes et al.
3,605,088 A     9/1971  Savelli
(Continued)

FOREIGN PATENT DOCUMENTS

CN    101610420 A    12/2009
DE      3931518 A1    4/1991
(Continued)

OTHER PUBLICATIONS

Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.
(Continued)

*Primary Examiner* — Thomas G Black
*Assistant Examiner* — Sze-Hon Kong
(74) *Attorney, Agent, or Firm* — Frank MacKenzie; Price Heneveld LLP

(57) ABSTRACT

A target monitoring system and method are provided herein. An imager is configured to image a scene rearward of a vehicle and containing a target disposed on a trailer attached to the vehicle. A controller is configured to receive images from the imager, modify each image to increase the size of the imaged target, and analyze the modified images to determine at least one trailer related information.

13 Claims, 10 Drawing Sheets

Related U.S. Application Data which is a continuation-in-part of application No. 14/256,427, filed on Apr. 18, 2014, now Pat. No. 9,493,187, which is a continuation-in-part of application No. 14/249,781, filed on Apr. 10, 2014, now Pat. No. 9,374,562, which is a continuation-in-part of application No. 14/188,213, filed on Feb. 24, 2014, now abandoned, which is a continuation-in-part of application No. 13/847,508, filed on Mar. 20, 2013, now abandoned, and a continuation-in-part of application No. 14/068,387, filed on Oct. 31, 2013, now Pat. No. 9,102,271, which is a continuation-in-part of application No. 14/059,835, filed on Oct. 22, 2013, now Pat. No. 9,248,858, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, now Pat. No. 9,346,396, which is a continuation-in-part of application No. 14/059,835, filed on Oct. 22, 2013, now Pat. No. 9,248,858, said application No. 14/249,781 is a continuation-in-part of application No. 14/201,130, filed on Mar. 7, 2014, now Pat. No. 9,290,202, which is a continuation-in-part of application No. 14/068,387, filed on Oct. 31, 2013, now Pat. No. 9,102,271.

(60) Provisional application No. 61/477,132, filed on Apr. 19, 2011.

(51) Int. Cl.
| | | |
|---|---|---|
| *G01B 7/30* | (2006.01) | |
| *G06K 9/32* | (2006.01) | |
| *B60Q 9/00* | (2006.01) | |
| *B60D 1/36* | (2006.01) | |
| *B62D 15/02* | (2006.01) | |

(52) U.S. Cl.
CPC ..... *B62D 15/0275* (2013.01); *B62D 15/0285* (2013.01); *G01B 7/30* (2013.01); *G06K 9/32* (2013.01); *G06K 9/3216* (2013.01); *H04N 7/183* (2013.01); *G06T 2207/30204* (2013.01)

(58) Field of Classification Search
CPC . G06T 2207/30236; G06T 2207/30241; G06T 3/0006; G06T 3/40; G06T 3/60; G06T 7/215; G06T 7/277; G06T 7/74; G06T 2207/30204; B62D 13/06; B62D 15/028; B62D 15/025; B62D 15/0285; B62D 15/0275; B60Q 9/005; B60D 1/36; B60R 1/00; B60R 2300/105; B60R 2300/806; B60T 2201/10; B60T 2230/08; B60T 8/1708; G06K 9/00228; G06K 9/00536; G06K 9/3216; G06K 9/32; H04N 19/124; H04N 19/132; H04N 19/139; H04N 19/17; H04N 7/0042; H04N 7/183; G01B 11/2755; G01B 2210/30; G01B 7/30
See application file for complete search history.

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,430,637 A | 2/1984 | Koch-Ducker et al. |
| 4,735,432 A | 4/1988 | Brown |
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,142,278 A | 8/1992 | Moallemi et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,442,810 A | 8/1995 | Jenquin |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,834,749 A * | 11/1998 | Durbin .............. G06K 7/10722 235/454 |
| 5,905,433 A | 5/1999 | Wortham |
| 5,951,035 A | 9/1999 | Phillips, Jr. et al. |
| 5,969,325 A * | 10/1999 | Hecht .............. G06K 7/14 235/455 |
| 5,970,619 A | 10/1999 | Wells |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,100,795 A | 8/2000 | Otterbacher et al. |
| 6,124,709 A | 9/2000 | Allwine |
| 6,151,175 A | 11/2000 | Osha |
| 6,178,650 B1 | 1/2001 | Thibodeaux |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,318,747 B1 | 11/2001 | Ratican |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,837,432 B2 | 1/2005 | Tsikos et al. |
| 6,838,979 B2 | 1/2005 | Deng et al. |
| 6,854,557 B1 | 2/2005 | Deng et al. |

(56) References Cited

U.S. PATENT DOCUMENTS

| | | |
|---|---|---|
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,036,840 B2 | 5/2006 | Kwilinski |
| 7,039,504 B2 | 5/2006 | Tanaka et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,309,075 B2 | 12/2007 | Ramsey et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,619,680 B1 | 11/2009 | Bingle et al. |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,744,109 B2 | 6/2010 | Groh |
| 7,760,077 B2 | 7/2010 | Day |
| 7,777,615 B2 | 8/2010 | Okuda et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 | 11/2011 | Bennie et al. |
| 8,073,594 B2 | 12/2011 | Lee et al. |
| 8,138,899 B2 | 3/2012 | Ghneim |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,179,238 B2 | 5/2012 | Roberts, Sr. et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,037 B1 * | 12/2012 | Abitz ................... G06K 7/1443 235/462.01 |
| 8,326,504 B2 | 12/2012 | Wu et al. |
| 8,332,097 B2 | 12/2012 | Chiba et al. |
| 8,342,560 B2 | 1/2013 | Albers et al. |
| 8,362,888 B2 | 1/2013 | Roberts, Sr. et al. |
| 8,380,390 B2 | 2/2013 | Sy et al. |
| 8,380,416 B2 | 2/2013 | Offerle et al. |
| 8,390,696 B2 | 3/2013 | Komoto et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,451,107 B2 | 5/2013 | Lu et al. |
| 8,469,125 B2 | 6/2013 | Yu et al. |
| 8,471,905 B2 * | 6/2013 | Kennedy ............... F41G 7/2253 348/144 |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,620,069 B1 * | 12/2013 | Pinkus .................. G06K 9/468 382/165 |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,836,786 B2 | 9/2014 | Seger et al. |
| 8,886,400 B2 | 11/2014 | Kossira et al. |
| 8,888,120 B2 | 11/2014 | Trevino |
| 8,888,121 B2 | 11/2014 | Trevino et al. |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Molls et al. |
| 9,120,359 B2 | 9/2015 | Chiu et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,315,151 B2 | 4/2016 | Taylor et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,499,018 B2 | 11/2016 | Gehrke et al. |
| 9,500,497 B2 | 11/2016 | Lavoie |
| 9,610,974 B2 | 4/2017 | Herzog et al. |
| 9,623,904 B2 | 4/2017 | Lavoie et al. |
| 9,676,377 B2 | 6/2017 | Hafner et al. |
| 9,773,319 B2 * | 9/2017 | Oka ........................ G06T 7/13 |
| 9,798,953 B2 | 10/2017 | Hu |

(56) References Cited

U.S. PATENT DOCUMENTS

| | | |
|---|---|---|
| 9,836,060 B2 | 12/2017 | Ghneim et al. |
| 10,046,800 B2 | 8/2018 | Hu et al. |
| 2001/0024333 A1 | 9/2001 | Rost |
| 2001/0037164 A1 | 11/2001 | Hecker |
| 2002/0128764 A1 | 9/2002 | Hecker et al. |
| 2002/0149673 A1 | 10/2002 | Hirama et al. |
| 2003/0067595 A1* | 4/2003 | Alderson ............ G01M 11/0292 356/124.5 |
| 2003/0151614 A1* | 8/2003 | Knee ..................... G06T 3/60 345/619 |
| 2003/0234512 A1 | 12/2003 | Holub |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0207525 A1 | 10/2004 | Wholey et al. |
| 2004/0222881 A1 | 11/2004 | Deng et al. |
| 2005/0000738 A1 | 1/2005 | Gehring et al. |
| 2005/0074143 A1 | 4/2005 | Kawai |
| 2005/0128059 A1* | 6/2005 | Vause ..................... B60P 3/36 340/431 |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0007318 A1* | 1/2006 | Kanayama ........... H04N 1/00212 348/211.3 |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0171704 A1 | 8/2006 | Bingle et al. |
| 2006/0244579 A1 | 11/2006 | Raab |
| 2006/0250501 A1 | 11/2006 | Widmann et al. |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2007/0291140 A1* | 12/2007 | Baba ..................... G06T 7/74 348/240.99 |
| 2008/0100709 A1* | 5/2008 | Furukawa ............. G01S 3/7865 348/169 |
| 2008/0143593 A1 | 6/2008 | Graziano et al. |
| 2008/0147277 A1 | 6/2008 | Lu et al. |
| 2008/0180526 A1 | 7/2008 | Trevino |
| 2008/0196076 A1* | 8/2008 | Shatz ................... H04N 1/00127 725/116 |
| 2008/0231701 A1 | 9/2008 | Greenwood et al. |
| 2008/0231707 A1 | 9/2008 | Fontana |
| 2008/0296390 A1* | 12/2008 | Dudek ............ G06K 19/06009 235/469 |
| 2008/0312792 A1 | 12/2008 | Dechamp |
| 2009/0005932 A1 | 1/2009 | Lee et al. |
| 2009/0022403 A1* | 1/2009 | Takamori ............. H04N 19/139 382/195 |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0169054 A1* | 7/2009 | Chang ................. G06K 9/00221 382/103 |
| 2009/0198425 A1 | 8/2009 | Englert |
| 2009/0212113 A1* | 8/2009 | Chiu ..................... G06K 7/14 235/462.41 |
| 2009/0228182 A1 | 9/2009 | Waldbauer et al. |
| 2009/0231441 A1 | 9/2009 | Walker et al. |
| 2009/0248346 A1 | 10/2009 | Fennel et al. |
| 2009/0271078 A1 | 10/2009 | Dickinson |
| 2009/0300701 A1 | 12/2009 | Karaoguz et al. |
| 2009/0306861 A1 | 12/2009 | Schumann et al. |
| 2010/0054595 A1* | 3/2010 | Demandolx ......... G06K 9/3275 382/170 |
| 2010/0063702 A1 | 3/2010 | Sabelstrom et al. |
| 2010/0156667 A1 | 6/2010 | Bennie et al. |
| 2010/0171828 A1 | 7/2010 | Ishii |
| 2010/0322478 A1* | 12/2010 | Nitanda .................. G06T 5/002 382/103 |
| 2010/0324770 A1 | 12/2010 | Ramsey et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0025482 A1 | 2/2011 | Algueera et al. |
| 2011/0050903 A1 | 3/2011 | Vorobiev |
| 2011/0075016 A1* | 3/2011 | Shimizu ............... H04N 5/2171 348/345 |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0182502 A1* | 7/2011 | Liang .................... G06T 3/4007 382/162 |
| 2011/0216199 A1 | 9/2011 | Trevino et al. |
| 2011/0257860 A1 | 10/2011 | Getman et al. |
| 2011/0285874 A1* | 11/2011 | Showering ............. G06K 9/033 348/231.99 |
| 2011/0290882 A1* | 12/2011 | Gu ..................... G06K 7/1456 235/462.11 |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0121204 A1* | 5/2012 | Ding ..................... G06T 3/0012 382/260 |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0205436 A1* | 8/2012 | Thomas ............... G06K 17/0025 235/375 |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0301030 A1* | 11/2012 | Seto ................. H04N 21/41407 382/190 |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0057728 A1* | 3/2013 | Ushijima ............... G03B 13/36 348/231.99 |
| 2013/0069980 A1* | 3/2013 | Hartshorne ............. G09G 5/00 345/620 |
| 2013/0082453 A1 | 4/2013 | Padula |
| 2013/0127915 A1* | 5/2013 | Gilra ..................... G09G 5/00 345/660 |
| 2013/0135468 A1* | 5/2013 | Kim ..................... G06K 9/00771 348/143 |
| 2013/0141578 A1 | 6/2013 | Chundrlik, Jr. et al. |
| 2013/0153662 A1* | 6/2013 | Narasa Prakash ... G06K 7/1486 235/462.07 |
| 2013/0158803 A1 | 6/2013 | Headley |
| 2013/0158863 A1 | 6/2013 | Skvarce et al. |
| 2013/0179038 A1 | 7/2013 | Goswami et al. |
| 2013/0193211 A1* | 8/2013 | Baqai ................... G06K 7/1413 235/462.04 |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |

(56) References Cited

U.S. PATENT DOCUMENTS

| | | | |
|---|---|---|---|
| 2013/0342720 A1* | 12/2013 | Azami | H04N 9/04 348/222.1 |
| 2014/0005918 A1 | 1/2014 | Qiang | |
| 2014/0025260 A1 | 1/2014 | McClure | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0067154 A1 | 3/2014 | Yu et al. | |
| 2014/0067155 A1 | 3/2014 | Yu et al. | |
| 2014/0085472 A1 | 3/2014 | Lu et al. | |
| 2014/0088824 A1 | 3/2014 | Ishimoto | |
| 2014/0125795 A1 | 5/2014 | Yerke | |
| 2014/0133761 A1* | 5/2014 | Hikida | G06K 9/4604 382/199 |
| 2014/0160276 A1 | 6/2014 | Pliefke et al. | |
| 2014/0172232 A1 | 6/2014 | Rupp et al. | |
| 2014/0183841 A1 | 7/2014 | Jones | |
| 2014/0188344 A1 | 7/2014 | Lavoie | |
| 2014/0188346 A1 | 7/2014 | Lavoie | |
| 2014/0200759 A1* | 7/2014 | Lu | B60D 1/245 701/28 |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0231501 A1* | 8/2014 | Mykhailenko | G06K 7/1456 235/375 |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0277941 A1 | 9/2014 | Chiu et al. | |
| 2014/0277942 A1 | 9/2014 | Kyrtsos et al. | |
| 2014/0294309 A1* | 10/2014 | Haraguchi | G06K 9/00362 382/224 |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0307095 A1 | 10/2014 | Wierich | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0354811 A1 | 12/2014 | Weber | |
| 2014/0358429 A1 | 12/2014 | Shutko et al. | |
| 2014/0379217 A1 | 12/2014 | Rupp et al. | |
| 2015/0002670 A1 | 1/2015 | Bajpai | |
| 2015/0010228 A1* | 1/2015 | Rogers | G06K 9/00536 382/141 |
| 2015/0015712 A1* | 1/2015 | Sempuku | G08G 1/165 348/148 |
| 2015/0035256 A1 | 2/2015 | Klank et al. | |
| 2015/0057903 A1 | 2/2015 | Rhode et al. | |
| 2015/0066296 A1 | 3/2015 | Trombley et al. | |
| 2015/0066298 A1 | 3/2015 | Sharma et al. | |
| 2015/0077557 A1 | 3/2015 | Han et al. | |
| 2015/0105975 A1 | 4/2015 | Dunn | |
| 2015/0115571 A1 | 4/2015 | Zhang et al. | |
| 2015/0120141 A1 | 4/2015 | Lavoie et al. | |
| 2015/0120143 A1 | 4/2015 | Schlichting | |
| 2015/0134183 A1 | 5/2015 | Lavoie et al. | |
| 2015/0138340 A1 | 5/2015 | Lavoie | |
| 2015/0139534 A1* | 5/2015 | Komatsu | G06T 7/0075 382/154 |
| 2015/0149040 A1 | 5/2015 | Hueger et al. | |
| 2015/0158527 A1 | 6/2015 | Hafner et al. | |
| 2015/0165850 A1 | 6/2015 | Chiu et al. | |
| 2015/0172582 A1 | 6/2015 | Kiyohara et al. | |
| 2015/0197278 A1 | 7/2015 | Boos et al. | |
| 2015/0203156 A1 | 7/2015 | Hafner et al. | |
| 2015/0210254 A1 | 7/2015 | Pieronek et al. | |
| 2015/0210317 A1 | 7/2015 | Hafner et al. | |
| 2015/0217693 A1* | 8/2015 | Pliefke | B60R 1/00 348/118 |
| 2015/0251602 A1* | 9/2015 | Baur | B60R 1/00 348/148 |
| 2015/0269444 A1 | 9/2015 | Lameyre et al. | |
| 2015/0279021 A1* | 10/2015 | Wu | G06T 3/40 382/103 |
| 2015/0296202 A1* | 10/2015 | Zhong | H04N 13/0296 348/47 |
| 2015/0312493 A1* | 10/2015 | Aldridge | H04N 5/04 348/157 |
| 2015/0339827 A1* | 11/2015 | Oka | G06T 7/0085 382/199 |
| 2016/0001705 A1 | 1/2016 | Greenwood et al. | |
| 2016/0009288 A1 | 1/2016 | Yu | |
| 2016/0023603 A1 | 1/2016 | Vico et al. | |
| 2016/0039456 A1 | 2/2016 | Lavoie et al. | |
| 2016/0048732 A1* | 2/2016 | Matoba | G06K 9/00671 345/633 |
| 2016/0059780 A1 | 3/2016 | Lavoie | |
| 2016/0059888 A1 | 3/2016 | Bradley et al. | |
| 2016/0059889 A1 | 3/2016 | Herzog et al. | |
| 2016/0096549 A1 | 4/2016 | Herzog et al. | |
| 2016/0117824 A1* | 4/2016 | Amma | G01B 11/24 382/103 |
| 2016/0129939 A1* | 5/2016 | Singh | B62D 13/06 701/41 |
| 2016/0152263 A1* | 6/2016 | Singh | B60T 8/1708 701/41 |
| 2016/0153778 A1 | 6/2016 | Singh et al. | |
| 2016/0229452 A1 | 8/2016 | Lavoie et al. | |
| 2016/0280267 A1 | 9/2016 | Lavoie et al. | |
| 2017/0073005 A1 | 3/2017 | Ghneim et al. | |
| 2017/0150130 A1* | 5/2017 | Kimura | H04N 13/0402 |
| 2017/0177949 A1 | 6/2017 | Hu et al. | |
| 2017/0322551 A1* | 11/2017 | Zang | G05D 1/0038 |
| 2018/0025499 A1 | 1/2018 | Strano et al. | |

FOREIGN PATENT DOCUMENTS

| | | |
|---|---|---|
| DE | 9208595 U1 | 8/1992 |
| DE | 10030738 C1 | 8/2001 |
| DE | 10122562 C1 | 7/2002 |
| DE | 10154612 A1 | 5/2003 |
| DE | 10312548 B3 | 5/2004 |
| DE | 102004050149 A1 | 4/2006 |
| DE | 102005043466 A1 | 3/2007 |
| DE | 102006056408 A1 | 6/2008 |
| DE | 102007029413 A1 | 1/2009 |
| DE | 102012005707 A1 | 10/2012 |
| DE | 102011120814 A1 | 6/2013 |
| DE | 102013000198 A1 | 7/2014 |
| EP | 0418653 A1 | 3/1991 |
| EP | 1312492 A2 | 5/2003 |
| EP | 1361543 A2 | 11/2003 |
| EP | 2452549 A1 | 5/2012 |
| EP | 2551132 A1 | 1/2013 |
| EP | 2644477 A1 | 10/2013 |
| EP | 2682329 A1 | 1/2014 |
| EP | 2803944 A2 | 11/2014 |
| JP | 2002068032 A | 3/2002 |
| JP | 2003148938 A | 5/2003 |
| JP | 3716722 B2 | 11/2005 |
| JP | 2008027138 A | 2/2008 |
| JP | 2009171122 A | 7/2009 |
| JP | 2012166647 A | 9/2012 |
| WO | 2006042665 A1 | 4/2006 |
| WO | 2012103193 A1 | 8/2012 |
| WO | 2013048994 A1 | 4/2013 |
| WO | 2013070539 A1 | 5/2013 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2014174027 A1 | 10/2014 |

(56) References Cited

FOREIGN PATENT DOCUMENTS

| WO | 2015074027 A1 | 5/2015 |
| WO | 2015187467 A1 | 12/2015 |

OTHER PUBLICATIONS

Alpine Electronics of America, Inc., "Alpine Electronics Introduces Two New Driver Assist Solutions", press release, Jan. 7, 2010, 2 pgs., Torrance, California.
Wagner, M.; Zobel, D.; Meroth, A., "An Adaptive Software and Systems Architecture for Drivers Assistance Systems based on Service Orientation", International Journal of Machine Learning and Computing, Oct. 2011, pp. 359-366, vol. 1, No. 4, Germany.
"Rearview Parking Assist Systems", Donmar Sunroofs & Accessories, Brochure, Aug. 2013, 13 pgs.
"Trailer Vision", Trailer Vision Ltd., Brochure, www.trailervision.co.uk, Date Unknown, 4 pgs.
SH. Azadi, H.R. Rezaei Nedamani, and R. Kazemi, "Automatic Parking of an Articulated Vehicle Using ANSIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, 6 pages, no date provided.
J.R. Billing; J.D. Patten; R.B. Madill, "Development of Configurations for Infrastructure-Friendly Five- and Six-Axle SemiTrailers", National Research Council of Canada and Ontario Ministry of Transportation, 11 pages., no date provided.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, no date provided, 6 pages.
Jane McGrath, "How to Avoid Jackknifing", A Discovery Company, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, no date provided, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, no date provided, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, 2004, vol. 113, No. 6, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, Feb. 2010, vol. 225, No. 7, 1 page.
Haviland, G S, "Automatic Brake Control for Trucks—What Good Is It?", TRID, Society of Automotive Engineers, Sep. 1968, 1 page.

(56) References Cited

OTHER PUBLICATIONS

William E. Travis; David W. Hodo; David M. Bevly; John Y. Hung, "UGV Trailer Position Estimation Using a Dynamic Base RTK System", American Institute of Aeronautics and Astronautics, 12 pages, no date provided.

"VSE Electronic Trailer Steering", ETS for Trailers, version 2009, VSE Trailer Systems B.V., 28 pages.

"Telematics Past, Present, and Future," Automotive Service Association, www.ASAshop.org, May 2008, 20 pages.

"Fully Automatic Trailer Tow Hitch With LIN Bus," https://webista.bmw.com/webista/show?id=1860575499&lang=engb&print=1, no date provided, 5 pages.

"VBOX Yaw Rate Sensor With Integral Accelerometers," Racelogic, www.racelogic.co.uk, no date provided, 2 pages.

P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, Sep. 2011, vol. 2, No. 3, 8 pages.

Olof Enqvist, "AFS-Assisted Trailer Reversing," Institutionen för systemteknik Deartment of Electrical Engineering, Jan. 27, 2006, 57 pages.

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

\* cited by examiner

TARGET MONITORING SYSTEM AND METHOD

CROSS-REFERENCE TO RELATED APPLICATIONS

This patent application is continuation-in-part of U.S. patent application Ser. No. 14/257,420, now U.S. Pat. No. 9,708,000, which was filed on Apr. 21, 2014, entitled "TRAJECTORY PLANNER FOR A TRAILER BACKUP ASSIST SYSTEM," which is a continuation-in-part of U.S. patent application Ser. No. 14/256,427, now U.S. Pat. No. 9,493,187, which was filed on Apr. 18, 2014, entitled "CONTROL FOR TRAILER BACKUP ASSIST SYSTEM," which is a continuation-in-part of U.S. patent application Ser. No. 14/249,781, now U.S. Pat. No. 9,374,562, which was filed on Apr. 10, 2014, entitled "SYSTEM AND METHOD FOR CALCULATING A HORIZONTAL CAMERA TO TARGET DISTANCE," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, now U.S. Pat. No. 9,102,271, which was filed on Oct. 31, 2013, entitled "TRAILER MONITORING SYSTEM AND METHOD," which is a continuation-in-part of U.S. patent application Ser. No. 14/059,835, now U.S. Pat. No. 9,248,858, which was filed on Oct. 22, 2013, entitled "TRAILER BACKUP ASSIST SYSTEM," which is a continuation-in-part of U.S. patent application Ser. No. 13/443,743, now U.S. Pat. No. 8,825,328, which was filed on Apr. 10, 2012, entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, now U.S. Pat. No. 8,909,426, which was filed on Dec. 23, 2011, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." U.S. patent application Ser. No. 14/249,781, now U.S. Pat. No. 9,374,562 is also a continuation-in-part of U.S. patent application Ser. No. 14/161,832, now U.S. Pat. No. 9,346,396, which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835, now U.S. Pat. No. 9,248,858, which was filed on Oct. 22, 2013, entitled "TRAILER BACKUP ASSIST SYSTEM." Furthermore, U.S. patent application Ser. No. 14/249,781, now U.S. Pat. No. 9,374,562 is a continuation-in-part of U.S. application Ser. No. 14/201,130, now U.S. Pat. No. 9,290,202, which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, now U.S. Pat. No. 9,102,271, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure made herein relates generally to driver assist and active safety technologies in vehicles, and more particularly to a trailer backup assist system that employs image based target detection.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer can determine the position of the trailer relative to the vehicle with imager-based target detection. The accuracy and reliability of this hitch angle determination can be critical to the operation of the backup assist system.

SUMMARY OF THE INVENTION

According to one aspect of the present invention, a target monitoring system is provided. An imager is configured to image a scene rearward of a vehicle and containing a target disposed on a trailer attached to the vehicle. A controller is configured to receive images from the imager, modify each image to increase the size of the imaged target, and analyze the modified images to determine at least one trailer related information.

According to another aspect of the present invention, a target monitoring system is provided. An imager is configured to image a scene rearward of a vehicle and containing a target disposed on a trailer attached to a vehicle. A controller is configured to receive images from the imager, modify the images to increase the size of the imaged target, center the imaged target within each modified image, and analyze the modified images to determine at least one trailer related information.

According to a further aspect of the present invention, a target monitoring method is provided. The method includes the steps of: imaging a scene rearward of a vehicle and containing a target disposed on a trailer attached to a vehicle; supplying images to a controller; modifying each image to increase the size of the imaged target; and analyzing the modified images to determine at least one trailer related information.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
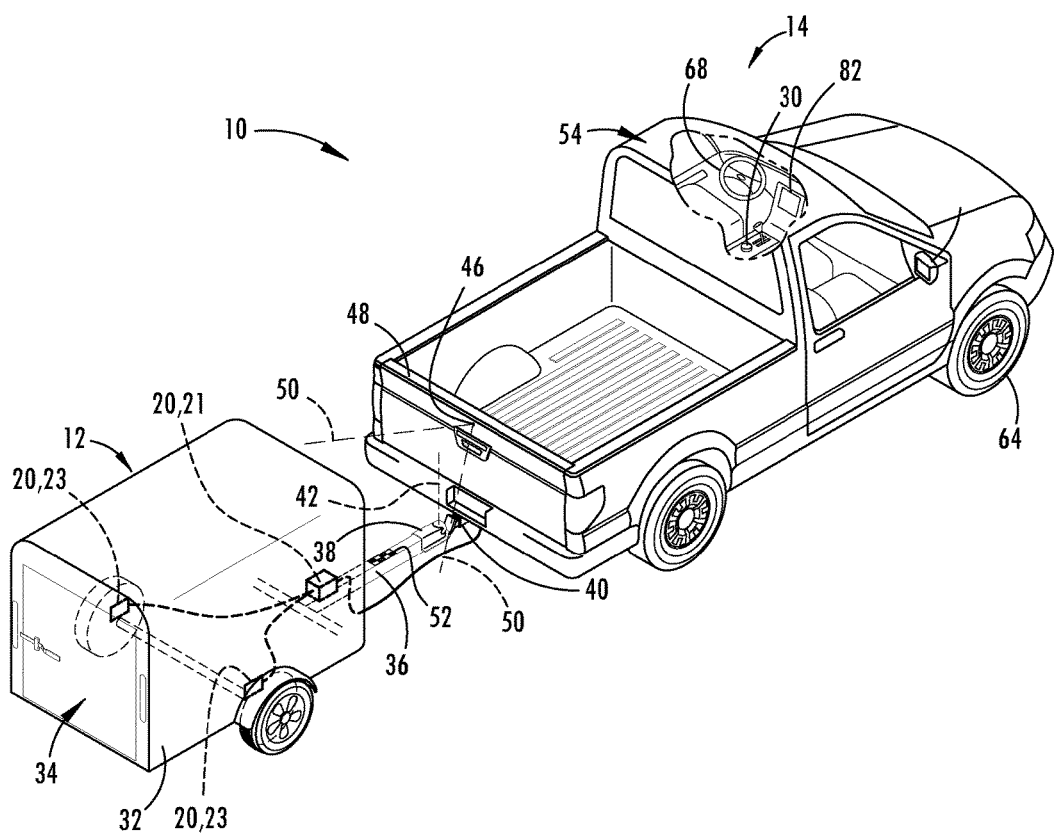
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-9, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle $\gamma$ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle $\gamma$. Accordingly, one embodiment of a sensor module 20 is adapted to attach to the trailer 12 and generate a trailer yaw rate $\omega_2$. The trailer backup assist system 10, according to such an embodiment, may also include a vehicle sensor system 17 that generates a vehicle yaw rate $\omega_1$ and a vehicle speed $v_1$. The controller 28 of the trailer backup assist system 10 may thereby estimate a hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may additionally or alternatively include a hitch angle sensor 44, such as a vision-based system that employs a camera 46 on the vehicle 14 to monitor a target 52 on the trailer 12 to determine the hitch angle $\gamma$ and in some embodiments further increase reliability of the overall estimated hitch angle $\gamma$.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller 28 may generate a steering command for the vehicle 14 to guide the trailer 12 on the desired curvature 26 based on the estimated hitch angle $\gamma$ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle $\gamma$. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle $\gamma$ between the vehicle 14 and the trailer 12. The illustrated hitch angle sensor 44 employs a camera 46 (e.g., video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21, in additional embodiments, may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
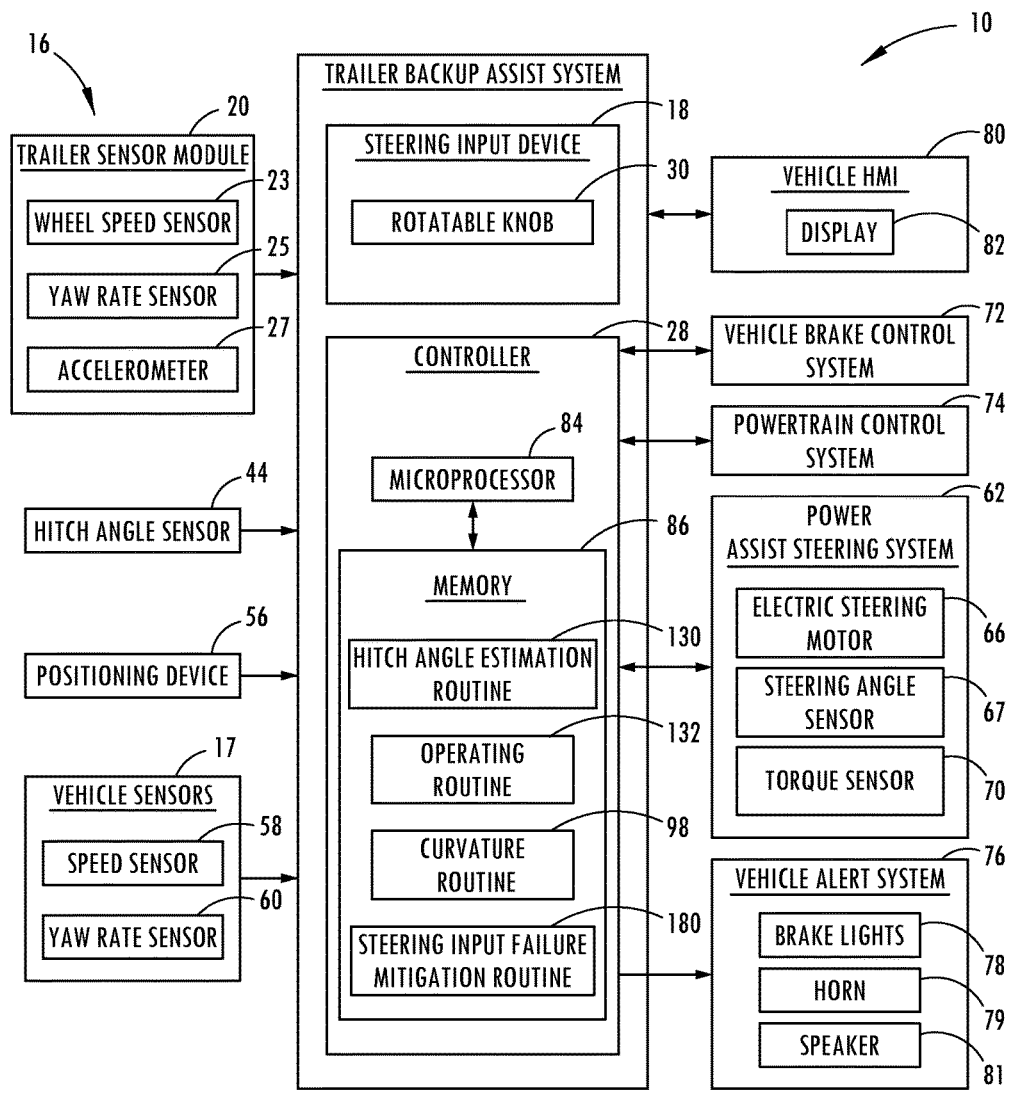
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the trailer backup assist system 10 may receive vehicle and trailer status-related information from additional sensors and devices. The additional sensors and devices may be used in lieu of the hitch angle sensor 44 or the sensor module 20 in the event that one or more sensors (e.g., hitch angle sensor 44) used for determining the hitch angle γ fail. This trailer status-related information includes positioning information from a positioning device 56, which may include a global positioning system (GPS) on the vehicle 14 or a hand held device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a vehicle yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64 via an internal torque, preventing manual intervention with the steering wheel 68 during autonomous steering. More specifically, a torque sensor 70 is provided on the power assist steering system 62 that senses torque (e.g., gripping and/or turning) on the steering wheel 68 that is not expected from autonomous control of the steering wheel 68 and therefore indicative of manual intervention by the driver. In some embodiments, external torque applied to the steering wheel 68 may serve as a signal to the controller 28 that the driver has taken manual control and for the vehicle 14 to discontinue steering maneuvers and/or alerts.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions, to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative, or in addition to, the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10, in some embodiments, may regulate speed of the vehicle 14 during backing of the trailer 12, which can reduce the potential for unacceptable trailer backup conditions. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. Unacceptable trailer backup conditions may result from the failure of one or more sensors (e.g., hitch angle sensor 44) and/or inputs (e.g., steering input device 18) on the vehicle 14 and/or trailer 12 to provide information to the controller 28 of the trailer backup assist system 10. In such events, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition, as further described herein.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability, or when the failure of a sensor and/or an input device is detected. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1) capable of displaying images indicating the alert. Such an embodiment may be desirable to notify the driver of the vehicle 14 that a sensor and/or input device used by the backup assist system 10 had failed. Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display an image indicating the sensor and/or input device that has failed. In addition, the portable device may provide feedback information, such as visual, audible, and tactile alerts.

As further illustrated in FIG. 2, the trailer backup assist system 10 includes the steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. Given the importance of the steering input device 18 in controlling the vehicle 14 and trailer 12 while in motion, safety systems directed toward mitigating a failure of the steering input device 18 by generating a countermeasure may be a desirable feature in the trailer backup assist system 10. Accordingly, the controller 28 of the trailer backup assist system 10 may detect failure of the steering input device 18 and engage a countermeasure when the steering input device 18 fails, until the driver regains operational control of the vehicle 14.

As will be discussed below in more detail, the steering input device 18, according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all, or a portion of, the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
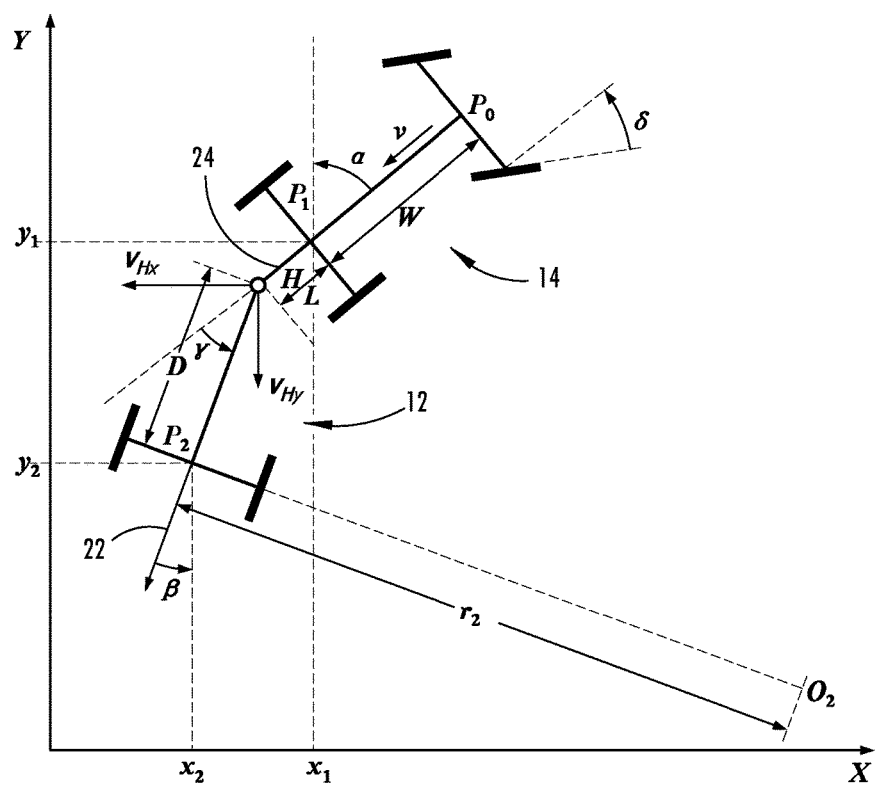
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer

12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
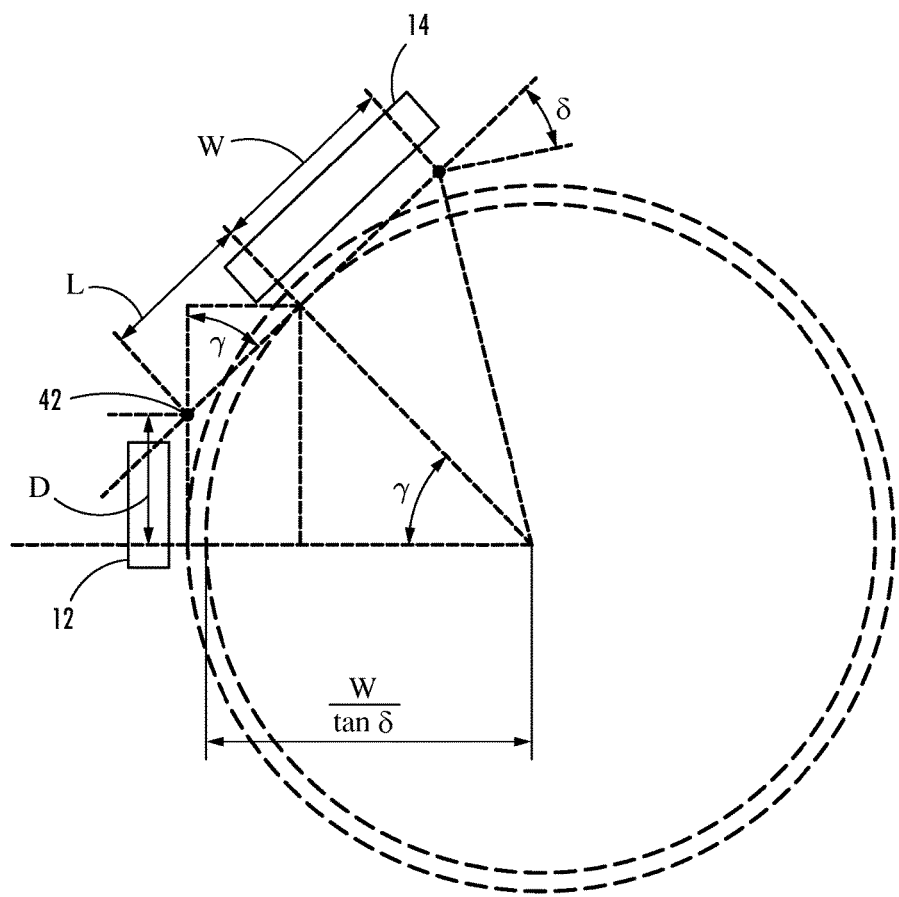
FIG. 4 is a schematic diagram showing a relationship between a hitch angle and a steering angle of the vehicle as it relates to curvature of the trailer and a jackknife angle.

Referring now to FIG. 4, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Thus, for limiting the potential for a vehicle/trailer system attaining a jackknife angle, it is preferable to control the yaw angle of the trailer 12 while keeping the hitch angle $\gamma$ of the vehicle/trailer system relatively small.

A kinematic model representation of the vehicle 14 and the trailer 12 can also be used to determine a jackknife angle for the vehicle-trailer combination. Accordingly, with reference to FIGS. 3 and 4, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(max)$. The steering angle for circular motion with hitch angle $\gamma$ is defined by the following equation.

$$\tan\delta_{max} = \frac{w\sin\gamma_{max}}{D + L\cos\gamma_{max}}$$

Solving the above equation for hitch angle $\gamma$ allows jackknife angle $\gamma(j)$ to be determined. This solution, which is shown in the following equation, can be used in implementing trailer backup assist functionality in accordance with the disclosed subject matter for monitoring hitch angle $\gamma$ in relation to jackknife angle.

$$\cos\bar{\gamma} = \frac{-b \pm \sqrt{b^2 - 4ac}}{2a}$$

where,
$a = L^2 \tan^2 \delta(max) + W^2$;
$b = 2LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle $\gamma$. This condition can be indicated when one or more specified vehicle operating thresholds are met while a particular hitch angle $\gamma$ is present. For example, although the particular hitch angle $\gamma$ is not currently at the jackknife angle for the vehicle 14 and attached trailer 12, certain vehicle operating parameters can lead to a rapid (e.g., uncontrolled) transition of the hitch angle $\gamma$ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle $\gamma$, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 5:
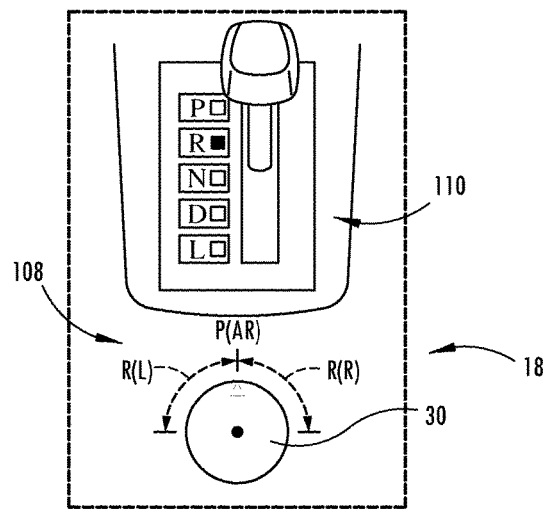
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes the rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
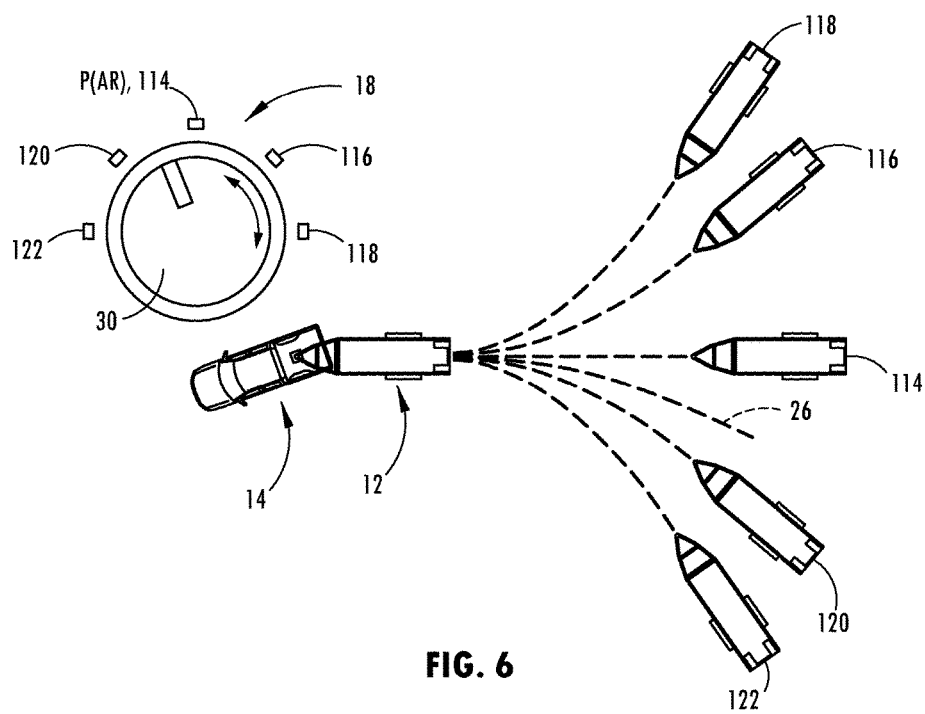
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 5-6, may be biased (e.g., by a spring return) to a center or at-rest position P(AR) 114 between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) 114 can increase (e.g., non-linearly) as a function of the amount of rotation of the rotatable knob 30 with respect to the at-rest position P(AR) 114. Additionally, the rotatable knob 30 can be configured with position indicating detents such that the driver can positively feel the at-rest position P(AR) 114 and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) 114 and a direction of movement of the rotatable knob 30 with respect to the at-rest position P(AR) 114. It is also contemplated that the rate of rotation of the rotatable knob 30 may also be used to determine the desired curvature output to the controller 28. The at-rest position P(AR) 114 of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 7:
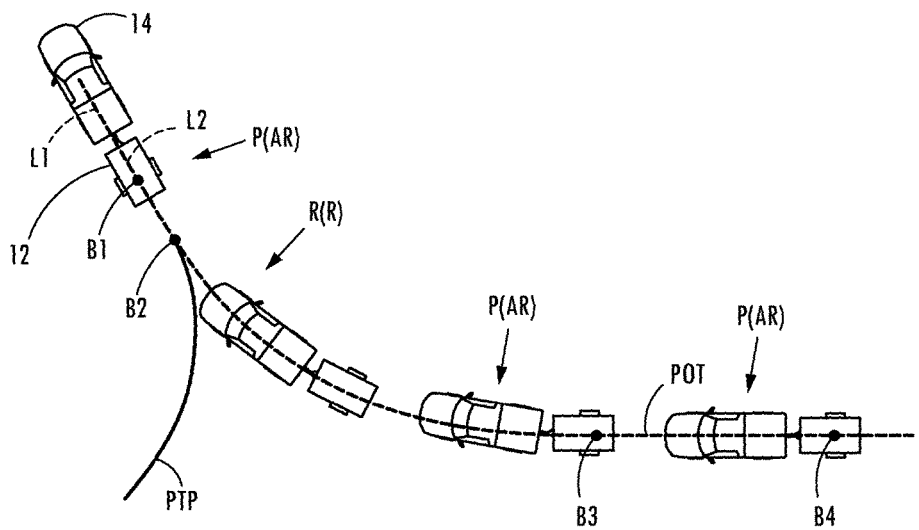
FIG. 7 is a schematic diagram showing a backup sequence of a vehicle and a trailer implementing various curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 which automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
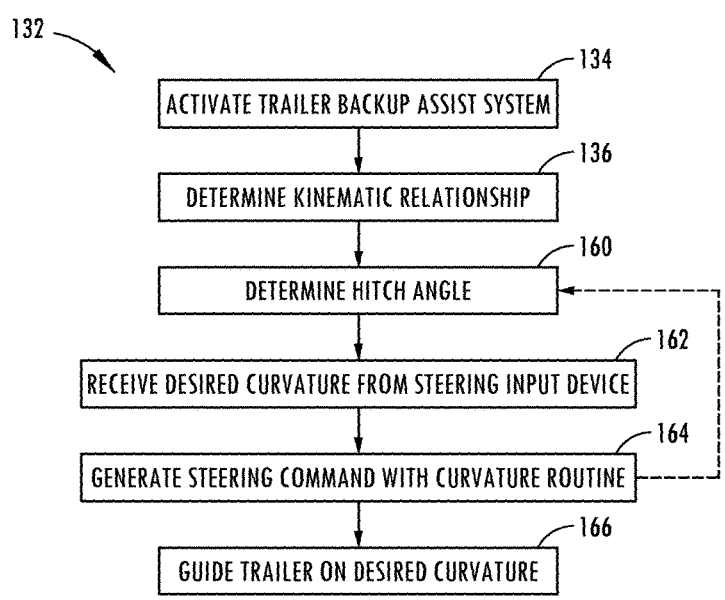
FIG. 8 is a flow diagram illustrating a method of operating a trailer backup assist system using an operating routine for steering a vehicle reversing a trailer with normalized control of the desired curvature, according to one embodiment.

With reference to FIG. 8, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such as making a selection on the display 82 of the vehicle HMI 80. The next step 136 then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3 and 4, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

Figure 9:
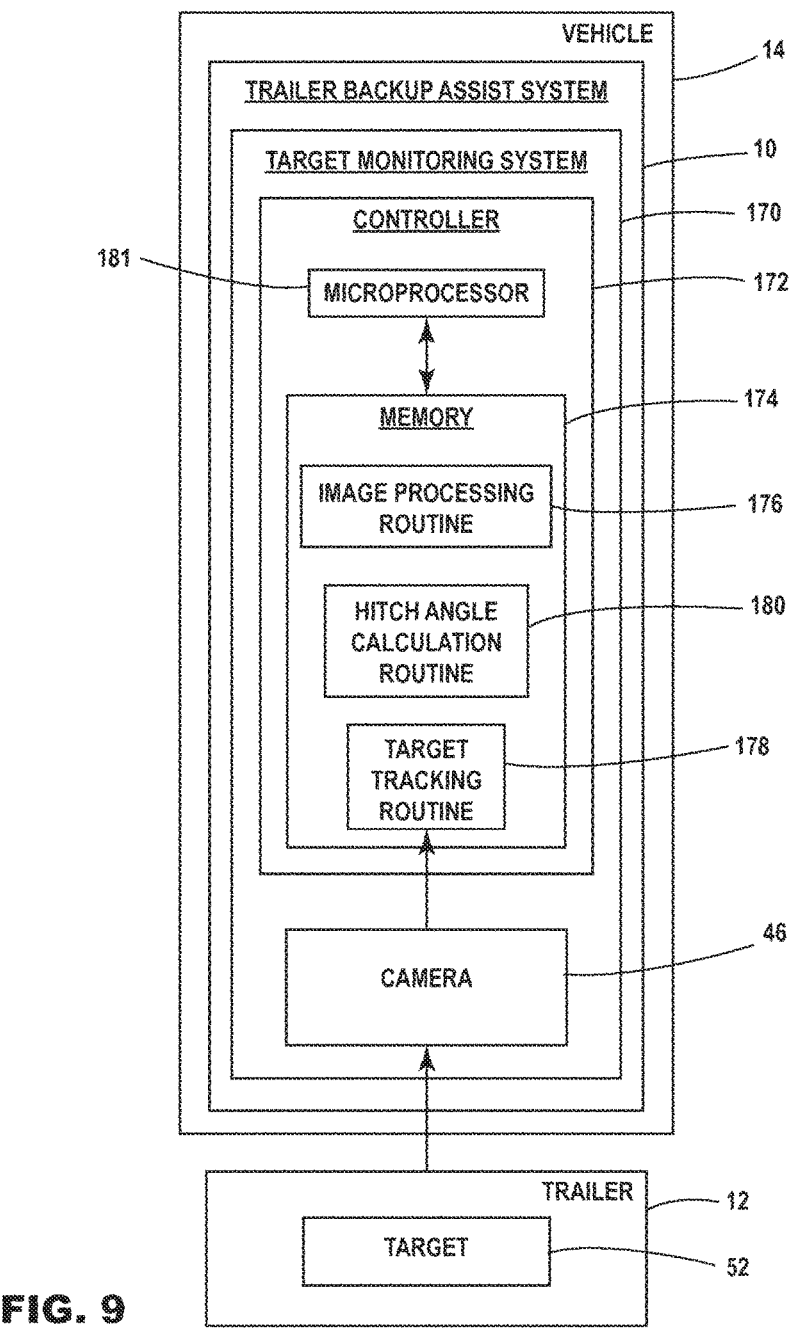
FIG. 9 is a block diagram illustrating one embodiment of a trailer monitoring system for use with the trailer backup assist system shown in FIGS. 1 and 2.

Referring to FIG. 9, a target monitoring system 170 of a vehicle 14 is shown according to one embodiment. The target monitoring system 170 may be a part of or otherwise utilized in conjunction with a trailer backup assist system 10. For purposes of illustration, the target monitoring system 170 is described herein as being adapted for use in the vehicle 14 shown in FIG. 1 and implemented using certain features of the trailer backup assist system 10 shown in FIGS. 1 and 2. However, it should be appreciated that the target monitoring system 170 may be implemented with only features that are exclusive thereto in other embodiments. It should also be appreciated that some features of the trailer backup assist system 10 have been omitted for clarity and the target monitoring system 170 is not necessarily reliant on any particular embodiment of the trailer backup assist system 10.

As shown in the illustrated embodiment, the target monitoring system 170 may include camera 46 or a separate imager communicatively coupled to a controller 172. Controller 172 may correspond to controller 28 described previously herein or a separate standalone controller communicatively coupled to controller 28 and/or other control functions of the trailer backup assist system 10. Controller 172 may include memory 174 for storing one or more routines including an image processing routine 176, a target tracking routine 178, and a hitch angle calculation routine 180. The controller 172 may also include a microprocessor 181 and/or other analog and/or digital circuitry for processing the routines 176, 178, 180.

In operation, camera 46 is configured to image a scene rearward of the vehicle 14 and containing target 52, which is disposed on a trailer 12 attached to the vehicle 14. The target 52 is typically an identifiable visual target that can be captured in an image by the camera 46 and detected and processed via image processing. The target may include an adhesive target, also referred to as a sticker, that may be adhered via adhesive on one side onto the trailer 12, preferably within a target placement zone, such that the camera and image processing may detect the target 52 and its location on the trailer 12 to determine trailer related information, such as the hitch angle between the trailer 12 and the vehicle 14. As described previously herein, camera 46 may be embodied as a video imaging camera that repeatedly captures successive images of the scene. The one or more images are supplied to the controller 172 to be processed with the image processing routine 176 to identify the target 52 and its location on the trailer 12. Once the target 52 has been identified, the hitch angle can be determined with the hitch angle calculation routine 180. For example, the hitch angle calculation routine 180 may determine the hitch angle by assessing characteristics of the target 52 such as, but not limited to, the location and/or orientation of the target 52 within the image. Additionally, the location and/or orientation of the target 52 may be tracked in successive images with the target tracking routine 178 to determine additional trailer related information such as, but not limited to, the rate of change of the hitch angle.

Figure 10:
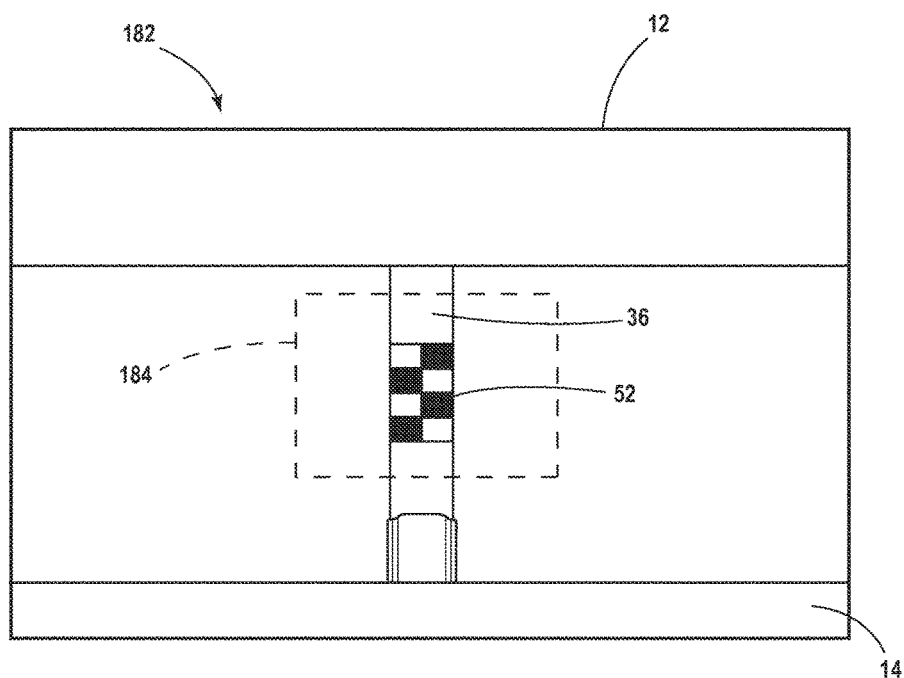
FIG. 10 is an example of an image captured by a camera of the trailer monitoring system of FIG. 9.

An example of an image 182 captured by camera 46 is shown in FIG. 10. The image 182 contains the target 52, which is disposed on the tongue 36 of the trailer 12. In other trailer embodiments, the target 52 may be located elsewhere. Given the numerous available vehicle and trailer configurations, it is generally more practical for a user (e.g., the vehicle operator) to select a trailer location on which to place the target 52. Preferably, the target 52 is positioned on the trailer 12 in a designated target placement zone 184 that is optimized for image capture. The target placement zone 184 may be generated by the controller 172 and shown to a user on a display 82 of the vehicle 14. The controller 172 may determine the target placement zone 184 based on information related to the camera 46, the vehicle 14, and/or the trailer 12. Additional information regarding target placement and target monitoring can be found in U.S. patent application Ser. No. 14/068,431, entitled "METHOD AND SYSTEM FOR MONITORING PLACEMENT OF A TARGET ON A TRAILER," filed Oct. 31, 2014, the entire disclosure of which is incorporated herein by reference.

No matter where the target 52 is found on the trailer 12, the target 52 will generally occupy a lesser portion of the image 182 when located at greater distances from the camera 46. As a result, less pixels are available to represent the target 52, which may hinder the ability of the controller 172 to identify and track the target 52 so that an accurate hitch angle can be determined. Recognizing this, the controller 172 may be configured to selectively modify images captured by the camera 46 so that the target 52 occupies a larger portion of the total image. A target monitoring method employing image modification is described below to facilitate accurate target identification and tracking, thereby reducing errors in hitch angle calculation.

Figure 11:
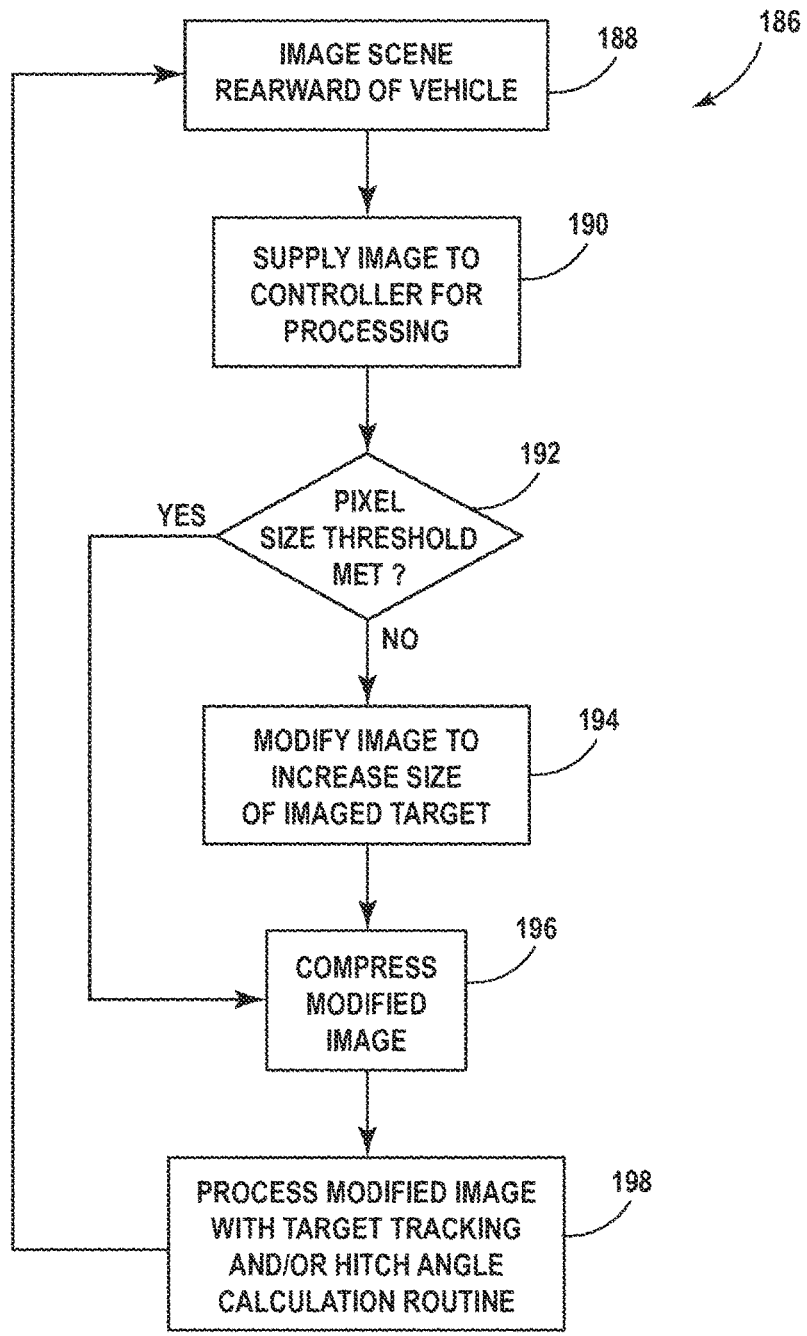
FIG. 11 is a flow diagram illustrating a trailer monitoring method according to one embodiment.

In FIG. 11, a flow diagram of a target monitoring method 186 is shown and is exemplarily described herein as being implemented using the target monitoring system 170 described above. At step 188, the camera 46 images a scene rearward of the vehicle 14. The resulting image (e.g., image 182) contains a target 52 disposed on a trailer 12 that is attached to a vehicle 14. At step 190, the image is supplied to the controller 172 for target identification with image processing routine 176. At step 192, the controller 172 checks if the imaged target 52 meets a pixel size threshold. The pixel size threshold may correspond to the minimum pixel size of the imaged target 52 that allows for accurate detection and tracking and may vary depending on the specifications of the camera 46 and processing capabilities of the controller 172. In determining the pixel size threshold, various factors affecting target detection may be considered such as, but not limited to, environmental conditions, lighting conditions, the like, or a combination thereof. If the imaged target 52 meets the pixel size threshold, the method 186 continues to step 196, which will be described further below. If the imaged target 52 does not meet the pixel size threshold, the controller 172 modifies the image to increase the image size of the target 52 relative to the total size of the captured image at step 194. In alternative embodiments, step 192 may be omitted in favor of always modifying the image regardless of the image size of the target 52.

Figure 12:
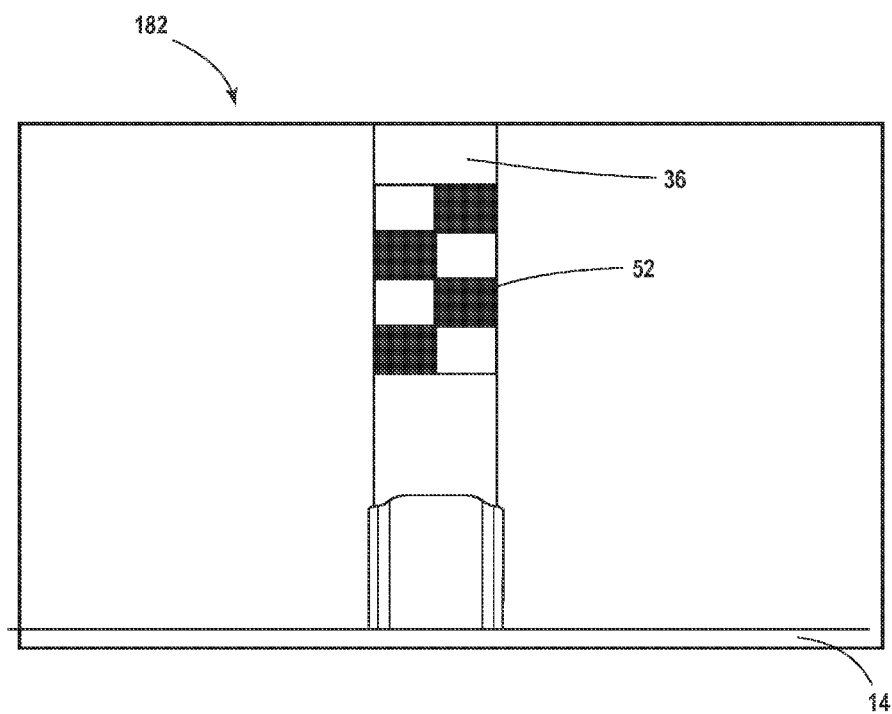
FIG. 12 shows a modified version of the captured image shown in FIG. 10.

For purposes of illustration, image 182 is shown modified in FIG. 12. Specifically, the modification includes cropping the original image 182 shown in FIG. 10 and centering the imaged target 52 therein. As a result, the imaged target 52 is substantially larger in the modified image 182 than it was in the original image 182. At step 196, the modified image may be compressed and stored to memory 174 of the controller 172 or otherwise processed at step 198 with the target tracking routine 178 and/or the hitch angle calculation routine 180. By compressing the modified image, more space is available in memory 174 for storing subsequent modified images and the modified images may be processed at higher rates by the target tracking routine 178 and/or the hitch angle calculation routine 180 at step 198. According to one embodiment, a modified image may be compressed from a 1 megapixel resolution to a 0.3 megapixel resolution. Since the imaged target 52 has a greater pixel size in the modified image, compression of the modified image does not generally degrade the image quality to an unacceptable level. At the completion of step 198, the method 186 may loop back to step 188 to capture another image that undergoes processing according to the steps outlined above.

Accordingly, a target monitoring system and method have been advantageously provided herein for accurately detecting a target placed on a trailer. As a result, hitch angles and other trailer related information may be more accurately obtained. Such information may be used by a trailer backup assist system in aiding an operator of a vehicle in performing a trailer backing maneuver.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A target monitoring system comprising:
an imager configured to capture an image of a target on a trailer; and
a controller configured to:
identify the target in the image;
determine if a pixel size of the target meets a minimum pixel threshold selected to facilitate identification of the target;
wherein if the pixel size of the target fails to meet the minimum pixel threshold, modify the image to increase a pixel size of the target relative to a total pixel size of the image;
compress the modified image from the first resolution to a second resolution; and
analyze the compressed modified image to determine at least one trailer related information.

2. The system of claim 1, wherein the controller modifies the image by cropping the image about the target.

3. The system of claim 1, wherein the controller is further configured to center the target in the modified image.

4. The system of claim 1, wherein the second resolution is lower than the first resolution.

5. The system of claim 1, wherein the at least one trailer related information comprises at least one of a hitch angle and a change in hitch angle.

6. The system of claim 1, for use in a trailer backup assist system.

7. A target monitoring method comprising the steps of:
capturing an image of a target on a trailer;
processing the image to identify the target;
determining if a pixel size of the target meets a minimum pixel threshold selected to facilitate identification of the target, and if not, modifying the image to increase the pixel size of the target relative to the image;
compressing the modified image from a first resolution to a second resolution; and
analyzing the compressed modified image to determine at least one trailer related information.

8. The method of claim 7, wherein the step of modifying comprises cropping the image about the imaged target.

9. The method of claim 7, further comprising the step of centering the target in the modified image.

10. The method claim 7, wherein the second resolution is lower than the first resolution.

11. The method of claim 7, wherein the at least one trailer related information comprises at least one of a hitch angle and a change in hitch angle.

12. The method of claim 7, further comprising the step of utilizing the method in conjunction with a trailer backup assist system to aid an operator of a vehicle in performing a trailer backing maneuver.

13. A target monitoring system comprising:
an imager capturing an image of a target on a trailer; and
a controller:
identifying the target in the image;
modifying the image to increase a pixel size of the target relative to a total pixel size of the image if the pixel size of the target fails to meet a minimum pixel threshold;
compressing the modified image; and
analyze the compressed modified image to determine trailer hitch angle information.

* * * * *